UNITED STATES PATENT OFFICE 2,331,278

AZO DYESTUFFS AND THEIR MANUFACTURE

Achille Conzetti and Guido Schetty, Basel, Switzerland, assignors to J. R. Geigy A. G., Basel, Switzerland, a firm No Drawing. Application March 26, 1942, Serial No. 436,366. In Switzerland January 15, 1941

8 Claims. (Cl. 260—201)

It has been found that valuable o,o'-hydroxy- or o-hydroxy-o'-carboxy azo dyestuffs are obtained by coupling diazotized, negatively substituted 2-amino-1-hydroxy benzenes or 2-aminobenzene-1-carboxylic acids respectively which contain no sulfonic acid groups, with hydroxynaphthalene sulfamides coupling in o-position to the hydroxy group of the following composition:

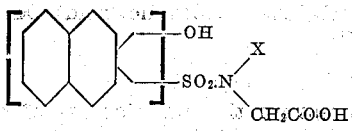

wherein X represents hydrogen, an alkyl or aryl group.

The dyestuffs obtained according to the present invention are very suitable for the dyeing according to the one-bath chroming method and are thus distinguished, in the same manner as for after-chroming, by a good levelling power, while the dyeings thus produced show remarkable fastness properties to wet-treatments and light.

Similar dyestuffs with an aromatically bound carboxylic group in the arylide radical have become known. However, compared with these dyestuffs the new dyestuffs are generally distinguished by a better drawing power, when treated according to the one-bath chroming method, and by a better levelling power, when treated according to the one-bath as well as according to the after-chroming method; in some cases the new dyestuffs are also superior with regard to solubility and to wet-treatment fastness. Furthermore, some of the new dyestuffs present a certain shifting of the shade towards the green side of the spectrum and in these cases most of the same present a nicer evening coloration.

The present invention is illustrated by the following examples without being limitative. The parts are by weight.

Example 1

The suspension of the diazo compound of 18.9 parts of 4-chloro-6-nitro-2-amino-1-hydroxybenzene neutralized by means of sodium bicarbonate until a Congo-violet reaction is reached, is introduced in form of a thin jet in the ice-cold suspension of 31.8 parts of the mono-sodium salt of 2-hydroxy-naphthalene-4-sulfonic acid amide-(N-methylene-carboxylic acid) in 170 parts of water containing 15 parts of anhydrous sodium carbonate and 15 parts of pyridine. After a few hours the dyestuff formation is completed. The dyestuff is then isolated by precipitation with common salt. When dried, it constitutes a dark bronzing powder which dyes wool, when treated according to the one-bath chroming method, with full grey-blue shades of excellent fastness properties to levelling, potting and light. The dyeing from a weak-acid bath is navy-blue which becomes grey-blue, when after-chromed. Similar dyestuffs are obtained by using the 2-hydroxy-naphthalene-4-sulfonic acid amide-(N-methyl- or -N-ethyl-,-propyl-,-butyl-) or the -(N-phenyl- or -N-tolyl- or -N-xylyl)-(N-methylene carboxylic acid), or the corresponding 2-hydroxynaphthalene-8-sulfonic acid derivatives instead of the 2-hydroxynaphthalene-4-sulfonic acid amide-(N-methylene carboxylic acid).

Example 2

13.7 parts of 2-aminobenzene-1-carboxylic acid are diazotized in the usual manner and the solution of the diazo compound made alkaline to a Congo-violet reaction by means of sodium bicarbonate is poured at 15–20° C. by portions into a suspension of 37.5 parts of 2-hydroxynaphthalene-6-sulfonic acid amide-(N-phenyl)-(N-methylene carboxylic acid) in 170 parts of water and 18 parts of anhydrous sodium carbonate. After a stirring for several hours at room temperature the completely precipitated dyestuff is drawn off by suction and, when dried, obtained in form of a red powder. It dyes wool, when treated according to the one-bath or after-chroming method, with full red shades of excellent fulling, potting and light fastness. The acid dyeing on wool is orange.

By using instead of 2-hydroxynaphthalene-6-sulfonic acid amide-(N-phenyl or -N-o-tolyl)-(N-methylene carboxylic acid), 2-hydroxynaphthalene-6-sulfonic acid amide-(N-methylene carboxylic acid), a similar dyestuff is obtained which, however, shows a better solubility in water. Moreover, the dyestuffs deriving from the corresponding 2-hydroxynaphthalene-7-sulfonic acid derivatives are very similar to the dyestuff above described.

The dyestuffs enumerated in the following table are also prepared according to the indications cited in the above examples.

| Example No. | Diazo component | Azo component | Dyeing on wool | |
|---|---|---|---|---|
| | | | Acid | After-chromed or treated according to the one-bath process |
| 3 | 5-nitro-2-amino-1-hydroxy-benzene. | 2-hydroxynaphthalene-4-sulfonic acid amide-(N-methylene carboxylic acid). | Wine-red | Grey-blue. |
| 4 | ---do--- | 2-hydroxynaphthalene-4-sulfonic acid amide-(N-phenyl)-(N-methylene carboxylic acid). | Dark wine-red. | Do. |
| 5 | 6-chloro-4-nitro-2-amino-1-hydroxy-benzene. | 2-hydroxynaphthalene-4-sulfonic acid amide-(N-methylene carboxylic acid). | Black | Brown-violet. |
| 6 | ---do--- | 2-hydroxynaphthalene-4-sulfonic acid amide-(N-phenyl)-(N-methylene carboxylic acid). | ---do--- | Dull black. |
| 7 | 4:6-dinitro-2-amino-1-hydroxy-benzene. | 2-hydroxynaphthalene-6-sulfonic acid amide-(N-methylene carboxylic acid). | Brown-red | Violet-brown. |
| 8 | ---do--- | 2-hydroxynaphthalene-6-sulfonic acid amide-(N-phenyl)-(N-methylene carboxylic acid). | ---do--- | Brown-violet. |
| 9 | 4:6-dichloro-2-amino-1-hydroxy-benzene. | 1-hydroxynaphthalene-4-sulfonic acid amide-(N-methylene carboxylic acid). | Red | Violet. |
| 10 | 4:6-dinitro-2-amino-1-hydroxy-benzene. | 1-hydroxynaphthalene-5-sulfonic acid amide-(N-methylene carboxylic acid). | Brown | Black. |
| 11 | ---do--- | 1-hydroxynaphthalene-5-sulfonic acid amide-(N-phenyl)-(N-methylene carboxylic acid). | ---do--- | Greenish-black. |

When in Examples 10 and 11 there are used the corresponding 1-hydroxynaphthalene-4-sulfonic acid derivatives, one obtains dyestuffs with similar properties.

The manufacture of the azo component may be indicated for the new compound used in Example 1: the hydroxynaphthalene-4-sulfonic acid amide-(N-methylene carboxylic acid) may be prepared by condensation of 2-carbomethoxy-hydroxynaphthalene-4-sulfonic acid chloride with amino acetic acid ethyl ester chlorohydrate in pyridine or dimethylaniline. By boiling the intermediately formed 2-carbomethoxy-hydroxynaphthalene-4-sulfonic acid amide-(N-methylene carboxylic acid ethyl ester) with the calculated quantity of alkali there is obtained the 2-hydroxynaphthalene-4-sulfonic acid amide-(N-methylene carboxylic acid) which can be isolated by acidifying with mineral acid in form of the free acid or, after neutralization, by salting out in form of its monoalkali salt.

Some of the new hydroxynaphthalene sulfonic acid amide derivatives are distinguished by a good crystallizing power, such as especially the derivatives of the 2-hydroxynaphthalene-4-sulfonic acid amide and of the 2-hydroxynaphthalene-6-sulfonic acid amide. The derivatives of the 1-hydroxynaphthalene-4- or -5-sulfonic acid amide, especially in the form of carboxylic acid esters, form difficultly crystallizing resins; the saponification products thereof, however, can in most cases easily be obtained by salting out in form of the crystalline monosodium salts.

Finally, some of the new compounds may be characterized by their melting points:

2-carbomethoxy-hydroxynaphthalene-4-sulfonic acid amide-(N-methylene carboxylic acid ethyl ester) M. P. 118–119° C.

2-carbomethoxy-hydroxynaphthalene-4-sulfonic acid amide-(N-phenyl)-(N-methylene carboxylic acid ethyl ester) M. P. 118–119° C.

2-carbomethoxy-hydroxynaphthalene-6-sulfonic acid amide-(N-methylene carboxylic acid ethyl ester) M. P. 109–110° C.

2-carbomethoxy-hydroxynaphthalene-6-sulfonic acid amide-(N-phenyl)-(N-methylene carboxylic acid ethyl ester) M. P. 103–104° C.

2-hydroxynaphthalene-4-sulfonic acid amide-(N-methylene carboxylic acid) M. P. 197–198° C.

2-hydroxynaphthalene-4-sulfonic acid amide-(N-phenyl)-(N-methylene carboxylic acid) M. P. 240–241° C.

2-hydroxynaphthalene-6-sulfonic acid amide-(N-methylene carboxylic acid) M. P. 207–209° C.

2-hydroxynaphthalene-6-sulfonic acid amide-(N-phenyl)-(N-methylene carboxylic acid) M. P. 203° C.

1-hydroxynaphthalene-5-sulfonic acid amide-(N-methylene carboxylic acid) M. P. 194–195° C.

What we claim is:

1. Process for the manufacture of o-hydroxy azo dyestuffs consisting in coupling a member of the group consisting of diazotized 2-amino-1-phenols substituted by a member of the group consisting of halogen and nitro and diazotized 2-aminobenzene-1-carboxylic acids with a hydroxynaphthalene sulfonic acid amide, coupling in o-position to the hydroxy group, of the general formula

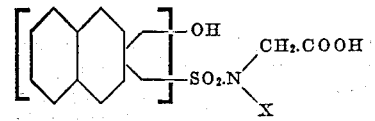

wherein X means a member of the group consisting of H, lower alkyl and aryl of the benzene series.

2. The o-hydroxy azo dyestuffs having in the free state the following general formula

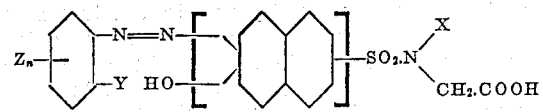

wherein X means a member of the group consisting of H, lower alkyl and aryl of the benzene series, Y means a member of the group consisting of OH and COOH, Z means a member of the group consisting of H, halogen and nitro, Z being only H when Y is a carboxyl group and $n$ being one of the numbers 1 and 2, the azo group and the hydroxy group in the naphthalene nucleus being in o-position to each other.

3. The o-hydroxy azo dyestuffs having in the free state the following general formula

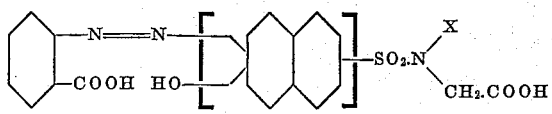

wherein X means a member of the group consisting of H, lower alkyl and aryl of the benzene series, the azo group and the hydroxy group in the naphthalene nucleus being in o-position to each other.

4. The o-hydroxy azo dyestuffs having in the free state the following general formula

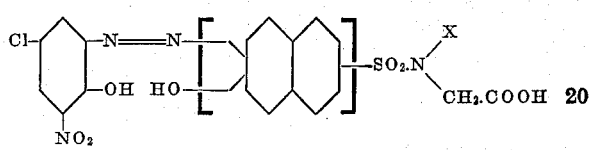

wherein X means a member of the group consisting of H, lower alkyl and aryl of the benzene series, the azo group and the hydroxy group in the naphthalene nucleus being in o-position to each other.

5. The o-hydroxy azo dyestuffs having in the free state the following general formula

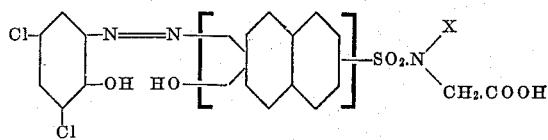

wherein X means a member of the group consisting of H, lower alkyl and aryl of the benzene series, the azo group and the hydroxy group in the naphthalene nucleus being in o-position to each other.

6. The o-hydroxy azo dyestuff having in the free state the following formula

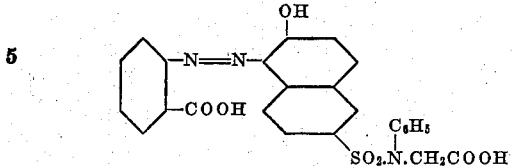

being when neutralized and dried a red powder, dyeing wool according to the one-bath or after-chroming method with full red shades of excellent fulling, potting and light fastness.

7. The o-hydroxy azo dyestuff having in the free state the following formula

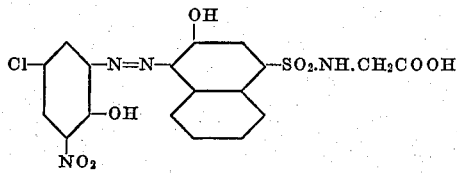

being when neutralized and dried a dark, bronzing powder dyeing wool according to the one-bath chroming method with full grey-blue shades of excellent fulling, potting and light fastness.

8. The o-hydroxy azo dyestuff having in the free state the following formula

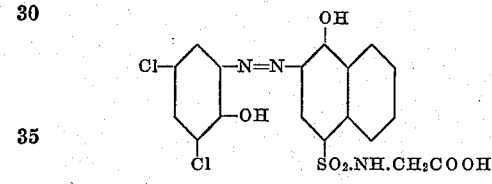

dyeing wool from an acid bath in red shades which by after-treatment with bichromate change to violet shades of excellent fastness properties.

ACHILLE CONZETTI.
GUIDO SCHETTY.